(12) United States Patent  
Ramachandran et al.

(10) Patent No.: US 12,333,287 B2  
(45) Date of Patent: Jun. 17, 2025

(54) SYSTEMS AND/OR METHODS FOR SIMPLIFYING PACKAGING AND INSTALLATION OF SOFTWARE IN MAINFRAME COMPUTER SYSTEMS

(71) Applicant: SOFTWARE AG, Darmstadt (DE)

(72) Inventors: Arunkumaar Ramachandran, Chennai (IN); Reinhard Springer, Fraenkisch-Crumbach (DE)

(73) Assignee: SOFTWARE GMBH, Darmstadt (DE)

( * ) Notice: Subject to any disclaimer, the term of this patent is extended or adjusted under 35 U.S.C. 154(b) by 155 days.

(21) Appl. No.: 17/990,108

(22) Filed: Nov. 18, 2022

(65) Prior Publication Data

US 2024/0168741 A1 May 23, 2024

(51) Int. Cl.
*G06F 8/61* (2018.01)
*G06F 8/65* (2018.01)

(52) U.S. Cl.
CPC .............. *G06F 8/61* (2013.01); *G06F 8/63* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 5,835,778 A | * | 11/1998 | Yoshihara | G06F 11/1402 713/1 |
| 6,711,178 B1 | * | 3/2004 | O'Gorman | H04L 69/16 370/473 |
| 8,752,041 B2 | * | 6/2014 | Akiyoshi | H04N 1/00965 717/176 |
| 9,032,199 B1 | * | 5/2015 | Dibble | G06F 11/1438 713/1 |
| 9,104,813 B2 | | 8/2015 | Stanquist et al. | |
| 9,218,173 B2 | | 12/2015 | Deng et al. | |
| 9,280,335 B2 | | 3/2016 | Adi et al. | |

(Continued)

OTHER PUBLICATIONS

Mirkin, Andrey, Alexey Kuznetsov, and Kir Kolyshkin. "Containers checkpointing and live migration." Proceedings of the Linux Symposium. vol. 2. 2008. (Year: 2008).*

(Continued)

*Primary Examiner* — Jason D Mitchell
(74) *Attorney, Agent, or Firm* — Nixon & Vanderhye PC (57) ABSTRACT

Certain example embodiments relate to techniques for installing and/or updating an application instance on a target mainframe. Packaged code, received by the target mainframe from a source mainframe in a deployment package, is executable on the target mainframe. The deployment package also includes a memory dump of control blocks of a source application running on the source mainframe. The control blocks constitute each program of the source application. The source application corresponds to the application instance to be installed/updated. The packaged code, when executed, is programmed to cause the target mainframe to: identify an area of memory of the target mainframe into which the control blocks from the memory dump are to be loaded; load the control blocks from the memory dump into the identified area of memory; and cause the target mainframe to branch to a first address in the identified area of the memory, in the installing/updating.

29 Claims, 2 Drawing Sheets

(56) References Cited

U.S. PATENT DOCUMENTS

| | | | |
|---|---|---|---|
| 9,304,887 B2 | 4/2016 | Ambe | |
| 9,720,673 B2 | 8/2017 | Deng et al. | |
| 10,019,252 B1* | 7/2018 | Cui | G06F 9/4401 |
| 11,169,791 B2 | 11/2021 | Velasco | |
| 11,200,041 B1 | 12/2021 | Cadarette et al. | |
| 2006/0248513 A1 | 11/2006 | Foster et al. | |
| 2011/0246981 A1* | 10/2011 | Braun | G06F 8/63 |
| | | | 717/175 |
| 2014/0173354 A1 | 6/2014 | Stanquist et al. | |
| 2017/0075675 A1 | 3/2017 | Babol et al. | |
| 2021/0240563 A1* | 8/2021 | Meyer | G06F 8/61 |
| 2021/0365256 A1* | 11/2021 | Cadarette | H04L 63/102 |
| 2023/0401080 A1* | 12/2023 | Scrivano | G06F 8/63 |
| 2024/0152412 A1* | 5/2024 | Conn | G06F 9/54 |

OTHER PUBLICATIONS

Loo, Henry, et al. "Live pod migration in kubernetes." University of British Columbia, Vancouver, Canada (2018). (Year: 2018).*

"Z/OS Basic Skills: z/OS Programming constructs: Modules, macros, components and control blocks" retrieved from <https://www.ibm.com/docs/en/zos-basic-skills?topic=zospves1-zos-programming-constructs-modules-macros-components-control-blocks> on Oct. 31, 2024.*

Christopher Tozzi, "6 Industries Where Mainframes are Still King," Precisely, Nov. 16, 2022, 3 pages. https://www.precisely.com/blog/mainframe/6-industries-mainframes-king.

IBM—What is SMP/E?, Mar. 3, 2021, 1 page. https://www.ibm.com/docs/en/zos/2.3.0?topic=concepts-what-is-smpe.

IBM—What is z/OS Container Extensions?, Apr. 8, 2021, 1 page. https://www.ibm.com/docs/en/zos/2.4.0?topic=extensions-what-is-zos-container.

IBM—z/OS Concepts, electronically retrieved Nov. 18, 2022, 2 pages. https://www.ibm.com/docs/en/zos-basic-skills?topic=storage-whats-in-address-space.

Longpela Expertise—LongEx Mainframe Quarterly, Nov. 2008, 2 pages. http://www.longpelaexpertise.com.au//ezine/CtBlksBeginners1.php.

* cited by examiner

SYSTEMS AND/OR METHODS FOR SIMPLIFYING PACKAGING AND INSTALLATION OF SOFTWARE IN MAINFRAME COMPUTER SYSTEMS

TECHNICAL FIELD

Certain example embodiments described herein relate to improvements to mainframe computer systems. More particularly, certain example embodiments described herein relate to techniques that simplify the packaging and installation of software used in mainframe computing systems (such as, for example, IBM mainframes running z/OS).

BACKGROUND AND SUMMARY

Mainframe computers have been used for years. For decades, mainframes were the only way to process huge amounts of data in reliable and stable computing environments. Mainframe computers have remained popular because many people view them as providing such stable and reliable computing services, while also offering secure and scalable services. Indeed, even today, mainframes are used to perform large-scale transaction processing, support large numbers of users and application programs (which may access the same computing resources), manage huge amounts of data in databases, handle large-bandwidth communications, etc. Mainframe computers have been used, and are still used in, a variety of mission critical and other applications such as, for example, applications in banking, financial services, insurance, and other sectors. Mainframes have been used for information retrieval and information processing services in fields ranging from scientific and engineering computations and modelling (e.g., related to how explosions will impact a building, how the nuclear stockpile is aging, and how nucleotides are assembled within genomes) to airline seat reservation systems and retail inventory management. According to one estimate, mainframes are used by 44 of the world's top 50 banks and the top 10 insurers in the world, as well as by the healthcare industry, government agencies (e.g., ranging from tax authorities to weather services), aviation authorities, and 23 of the top 25 retail companies.

A number of different mainframe computers and mainframe computer operating systems currently are available and in use. For instance, a modern IBM mainframe is one example of a very large multi-user multi-programming multi-processing computer that can run disparate workloads simultaneously for large-scale data processing. IBM Z is the latest generation of IBM mainframe, and IBM Z mainframes typically run the IBM Z Operating System (z/OS). Indeed, z/OS currently is the most popular IBM mainframe operating system. Installing software in a mainframe operating system like z/OS typically is performed using software installer tools.

A high level of skill typically is needed to operate these software installation tools correctly, e.g., to insure proper installation and maintenance of software in an operating system like z/OS. For example, the software to be installed may have to be packaged according to the format expected by the software installer tool. It may take significant effort to perform this packaging properly. Further, the installer tool may create a long trail of datasets and files such as, for example, control datasets that keep track of changes or backups that can help to backout "wrong" or problematic updates. These datasets and files may be left behind and may be required for maintaining the installed software. These datasets and files typically are different from artifacts related to customizations of the software that enable it to run in the mainframe world. Such customizations may include files specifying, for example, input and output network or other file locations, ports to expose, input/output interfaces, etc. Indeed, in the z/OS world, for example, installation and customization typically are seen as two different steps.

Unfortunately, a lot of people experienced with mainframe technology have retired or are planning to retire soon, even though mainframe applications are still widely used and indeed mission critical for many organizations. With a dwindling skillset, the difficulties associated with installing and maintaining software is becoming increasingly complicated and challenging. Overall, it takes considerable time and effort to roll out a piece of software or a software update, significantly delaying innovation in this fast-paced world, where innovation matters and where many applications are mission critical for organizations.

To try to address this issue, there are several approaches to installing software in z/OS systems (instances of IBM z/OS running in native LPAR or as a guest Operating System in z/VM or as an emulated Operating System in x86 based emulator like zPDT). For example, System Modification Program Extended (SMP/E) is a tool from IBM that is commonly used to install software in z/OS. But depending upon the software to be installed, a significant amount of disk storage may be required to hold the software before installation. Post-installation, there may be a long trail of datasets and files that are left behind and are required for software maintenance. This unfortunately puts pressure on disk storage management. Another challenge relates to choosing the proper configurations/versions of components to be installed. Overall, SMP/E typically still requires highly-skilled users to operate properly.

Another approach involves creating a tar ball or the like. In this approach, a Unix utility such as tar/pax is used in a manner where files and directories of a software product are compressed or zipped into a package. Using the same Unix utility, the software package can be decompressed or unzipped and stored in a target directory in a z/OS computer system. Unfortunately, however, this installation approach works only for small pieces of software and software that runs only in the Unix side of z/OS (also known as the z/OS Unix System Services (USS)). The approach therefore is limited in applicability in terms of the size of the software that it can install, as well as the locations to which that software can be installed.

Container technology also can be used to package, install, and deploy applications in a z/OS computer system. This containerization approach makes use of a virtualization layer (like a Docker engine) and may be Linux-based. This approach is popular, but the virtualization layer typically must be available before a software package can be created and also must be available on the target systems or machines that will run the software. Thus, there is a dependency on the virtualization layer. Another disadvantage with this installation approach relates to what needs to happen if the software to be installed is to integrate with other components of z/OS or other software in z/OS using standard z/OS instructions. In such cases, the application being installed may have to be rewritten to a considerable extent to accommodate limitations imposed by the container. Typical limitations include what communication protocols can be used. In this regard, the application being installed may have to be rewritten to use TCP/IP based inter-communication, e.g., to accommodate limitations of the container approach (which may not support z/OS instructions and/or may be limited to more arguably more ubiquitous TCP/IP based communications).

In view of the foregoing, it will be appreciated that it would be desirable to improve upon existing approaches for installing and/or maintaining software on mainframe computers such as, for example, those running z/OS.

Certain example embodiments solve technical challenges associated with current installation tools. For example, one aspect of certain example embodiments relates to a simple-to-deploy approach that involves taking and restoring memory dumps. This approach advantageously can reduce the amount of disk space required to install a new application. This approach advantageously also can avoid the need for a specialized build process. In this regard, this approach advantageously can reduce or eliminate the need to rewrite certain code to make it compliant with a virtualization technology (such as a container or the like) while also potentially easing issues associated with configuration.

Another aspect of certain example embodiments relates to an approach that makes software rollback simple. That is, in certain example embodiments, it is possible to easily back out of changes, e.g., by simply switching back to an older version upon a failure with a newly installed version via a restoration of a prior memory dump and a resetting of the program counter.

Still another aspect of certain example embodiments relates to the fact that there is no extra maintenance environment necessary, as might be needed in the case of a container or other virtualization approach. In a related regard, certain example embodiments advantageously do not have dependencies on complex technologies like containerization and virtualization that, although beneficial in some instances, nonetheless have their own idiosyncratic limitations (e.g., pertaining to communications within and outside of a given container or virtual environment).

Still another aspect of certain example embodiments relates to the ability to avoid dependencies on a target environment as may be the case when implementing a mimicking approach such as a "Record & Replay" approach that generally works only with the same environment. In a related regard, certain example embodiments advantageously do not necessarily need to be as concerned about artifacts created by the running software, e.g., to record states, as such artifacts can simply grow organically over time as the software is executed.

In certain example embodiments, a method of installing and/or updating an application instance on a target mainframe computing system is provided. The method includes executing packaged code on the target mainframe computing system, with the packaged code having been received by the target mainframe computing system from a source mainframe computing system as a part of a deployment package. The deployment package comprises the packaged code and a memory dump of control blocks of a source application running on the source mainframe computing system. The control blocks constitute each program of the source application. The source application corresponds to the application instance to be installed and/or updated. The packaged code, when executed, is programmed to cause the target mainframe computing system to perform operations comprising: identifying an area of memory of the target mainframe computing system into which the control blocks from the memory dump are to be loaded; loading the control blocks from the memory dump into the identified area of memory; and causing the target mainframe computing system to branch to a first address in the identified area of the memory, in installing and/or updating the application instance on the target mainframe computing system.

In certain example embodiments, a method of preparing an installation of and/or update to an application instance on a target mainframe computing system is provided. The method includes taking a memory dump of control blocks of a source application running on a source mainframe computing system. The control blocks constitute each program of the source application. The source application is a version of the application instance to be installed and/or updated. A deployment package comprising the memory dump and packaged code is created. The packaged code is executable on the target mainframe computing system. The packaged code, when executed being configured to cause the target mainframe computing system to perform operations comprising: identifying an area of memory of the target mainframe computing system into which the control blocks from the memory dump are to be loaded; loading the control blocks from the memory dump into the identified area of memory; and causing the target mainframe computing system to branch to a first address in the identified area of the memory, in the installation and/or updating of the application instance on the target mainframe computing system.

In certain example embodiments, the packaged code may be packaged into a data structure, e.g., with the data structure also including the memory dump.

In certain example embodiments, the source application may comprise a plurality of programs.

In certain example embodiments, the identified area of memory may be a private area of an address space of the target mainframe computing system.

In certain example embodiments, the memory dump may be taken from a private area of an address space on the source mainframe computing system.

In certain example embodiments, the identified area of memory may be identified based on size of the memory dump and addressing of instructions included in the memory dump.

In certain example embodiments, the packaged code may be further programmed to run a garbage collector on the target mainframe computing system after loading the control blocks from the memory dump into the identified area of memory and prior to causing the target mainframe computing system to branch to the first address in the identified area of the memory.

In certain example embodiments, the memory dump may include dynamically-created control blocks. In some instances, counterpart dynamically-created control blocks may be recreated at the target mainframe computing system during execution of the application instance, once installed and/or updated.

In certain example embodiments, the packaged code may be further configured to provide one or more parameters to the application instance being installed and/or updated. For instance, the one or more parameters may be provided prior to the deployment package being transmitted to the target mainframe computing system.

In certain example embodiments, the packaged code may be reusable for different applications without requiring customizations for the different applications.

In certain example embodiments, the deployment package may be transmitted to the target mainframe computing system, and the target mainframe computing system may be instructed to execute the packaged code once received.

In certain example embodiments, the source application may be programmed to initiate the memory dump automatically, e.g., upon the source application reaching a steady state in execution. In some instances, the steady state may be identifiable by the source application as being a predefined location in source code of the source application. In some instances, one or more steady state location identifiers may be inserted into code of the source application, and the source application may be programmed to initiate the memory dump automatically upon the source application reaching the one or more steady state location identifiers.

Also contemplated herein are non-transitory computer readable storage media storing instructions that, when executed by a processor, are configured to perform the methods summarized above and/pr described more fully below.

Also contemplated herein are computer programs used for generating the packaged code.

Still further, also contemplated herein are mainframe computing environments. Such mainframe computing environments may be from the perspective of just the source mainframe computing system, just the target mainframe computing system, or both the source and the target mainframe computing systems.

With respect to the previous paragraph, and by way of example, certain example embodiments relate to a mainframe computing environment. That environment comprises: a target mainframe computing system to which an application is to be installed and/or updated, with the target mainframe computing system including at least one first hardware processor and a first memory; and a source mainframe computing system including at least one second hardware processor and a second memory. The target mainframe computing system is configured to execute packaged code thereon, with the packaged code having been received by the target mainframe computing system from the source mainframe computing system as a part of a deployment package, with the deployment package comprising the packaged code and a memory dump of control blocks of a source application running on the source mainframe computing system, with the control blocks constituting each program of the source application, and with the source application corresponding to the application instance to be installed and/or updated. The packaged code, when executed, is programmed to cause the target mainframe computing system to perform operations comprising: identifying an area of the memory of the target mainframe computing system into which the control blocks from the memory dump are to be loaded; loading the control blocks from the memory dump into the identified area of memory; and causing the target mainframe computing system to branch to a first address in the identified area of the memory, in installing and/or updating the application instance on the target mainframe computing system.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to techniques that simplify the packaging and installation of software used in mainframe computing systems (such as, for example, IBM mainframes running z/OS). By way of background, it is noted that software application instances (or application processes) in z/OS typically run in a vehicle or placeholder, called an Address Space. In an Address Space, one or more applications or system functions can execute. To this Address Space, virtual memory (sometimes referred to as Virtual Storage in the mainframe world) is allocated by z/OS, e.g., as a combination of RAM (sometimes referred to as real storage in the mainframe world) and disk storage (disk acting as a memory extension and sometimes referred to as auxiliary storage in the mainframe world). When creating an Address Space and allocating Virtual Storage, z/OS does not use any additional virtualization software (such as, for example, vmware/kvm etc) and does not use a virtual disk image.

Like in many mainframe operating systems, in z/OS, the Virtual Storage of all Address Spaces have a standard layout. For example, there are exclusive areas reserved for a given process, and all of that process' control blocks (e.g., data, programs, etc.) are loaded only into this area. This area is referred to as a Private Area or Private Region. As is known to those skilled in the art, a control block in z/OS is an area of memory that holds information. When an Address Space is created to start an application, the Virtual Storage and Private Area are allocated by z/OS to the extent required to support the running of the process so as to optimize resources at a z/OS System level. As will be appreciated from the description below, because an application's control logic is in easily locatable memory (e.g., the Private Area or Private Region for z/OS), the application can be easily located and "cloned."

From a running instance of a z/OS software application, when in a steady-state (e.g., after a complete initialization), all of the control blocks of the software application would have been created by loading its programs to the Private Area of its Virtual Storage, and working storage sections for handling data would have been built in the Private Area.

Certain example embodiments create a software package by taking a selective memory dump, of this private or exclusive portion of Virtual Storage that has all the executable code and needed control blocks of the application, e.g., into a flat file or other data structure. A piece of code (sometimes referred to herein as "the Enlightener") instructs z/OS on the target installation platform to load the package generated from this memory dump into its Private Area. In certain example embodiments, the Enlightener might first create an Address Space, and then load the package generated from this memory dump into the Private Area. This may be performed in any z/OS system anywhere to create an application instance without an installation moderated by a standard installation tool. As will be described in greater detail below, the Enlightener is similar to a bootstrap loader, but with added intelligence. In certain example embodiments, the Enlightener performs tasks including looking at size of the dump; requesting the appropriate memory area(s) from the target system based on the size, location, addressing mode (e.g., 24-bit vs. 31-bit vs. 64-bit, as is common in the mainframe world) instructions, etc.; loading control blocks into designated area(s); branching to the start instruction of application to initialize it (unless there are multiple modules in application); etc. In certain example embodiments, the Enlightener may provide inputs or parameters to the newly-installed application.

The memory dump is selective in the sense that just the program code and required control blocks are taken in certain example embodiments (e.g., ignoring other items that might be in memory such as, for example, control blocks for other applications running on the mainframe, memory that has not been deallocated by a garbage collector, etc.). Even though some control blocks may be generated dynamically at runtime, certain example embodiments nonetheless are able to generate a package that enables the application to be installed on another system. This advantageously results because, if the code is correct, then starting the newly installed application from its beginning (with the application counter at 1) will dynamically create those control blocks at the proper time, somewhat like a situation where the application on the source were being restarted. This approach may in some instances create redundancies, but the package will still enable the proper installation of the application on another system because there will be at least one copy of each needed control block (and any redundancies can be ignored). Moreover, certain example embodiments may implement heuristics or rules to avoid taking or branching to dynamically-created control blocks. In certain example embodiments, a garbage collector may be run immediately after loading a clone into memory to clean up dynamically-created control blocks that, in the clone, have not yet been created because the application counter has been reset to 1.

The Enlightener's code can be added to the memory dump to create a final package for shipment, and/or it can be a separate package for shipment existing apart from the memory dump packaged for shipment. As a result, there is no need for any external virtualization software such as a docker or other container. Because the Enlightener is packaged with (e.g., in essence alongside of) the memory dump, there is no need for a dedicated installer or maintenance procedure. Instead, the memory dump simply can be restored in the target environment by the Enlightener. In certain example embodiments, the Enlightener may be packaged into a data structure that also includes the memory dump. In certain example embodiments, the memory dump may be augmented to include the Enlightener's code. For instance, the Enlightener may be prepended to the memory dump so that calling the first instruction of the restored memory dump will trigger the Enlightener and associated functionality, e.g., in connection with a flat file or the like.

Whenever there are changes to the software, a new software package can be created using the same process as described above. For example, a client can request a new software package and, in response, if the new software package is already running in a first environment, a memory dump can be taken, an Enlightener instance prepared and package for the memory dump, and then the dump can be restored and started on the client using the Enlightener instance.

Compared to a typical tool-based installation package, which not only contains application executables but also metadata required for the tool to handle the executables and to track application modifications, etc., the techniques of certain example embodiments in many or most instances will produce an application package for installation that is considerably smaller in size. This is technically advantageous in terms of disk space requirements for creation and deployment, as well as ease of transport from one system to another.

In some instances, an application to be installed or updated may comprise a plurality of programs. In such instances, the programs of the application in Virtual Storage will be loaded into the Private Area of Virtual Storage in such a way that the very first program in the memory dump is the entry point to begin execution of the application. Code will be started "from the beginning" as with a single-program application; however, "the beginning" in this instance will be the beginning of the first program in the multi-program application.

As alluded to above, in certain example embodiments, the application once installed or updated will be started from the beginning. That is, in certain example embodiments, the application will not be restarted from the position where the program counter was at the time of dump. In certain example embodiments, additional program state related data such as may be reflected in the contents of the heap and stack will not be saved. This may be advantageous in certain example embodiments in terms of saving size of the package. Additional dependencies from the operating system (e.g., opened files, interrupts that the application must wait for, etc.) can be handled through the normal course of the application being executed from its beginning.

Figure 1:
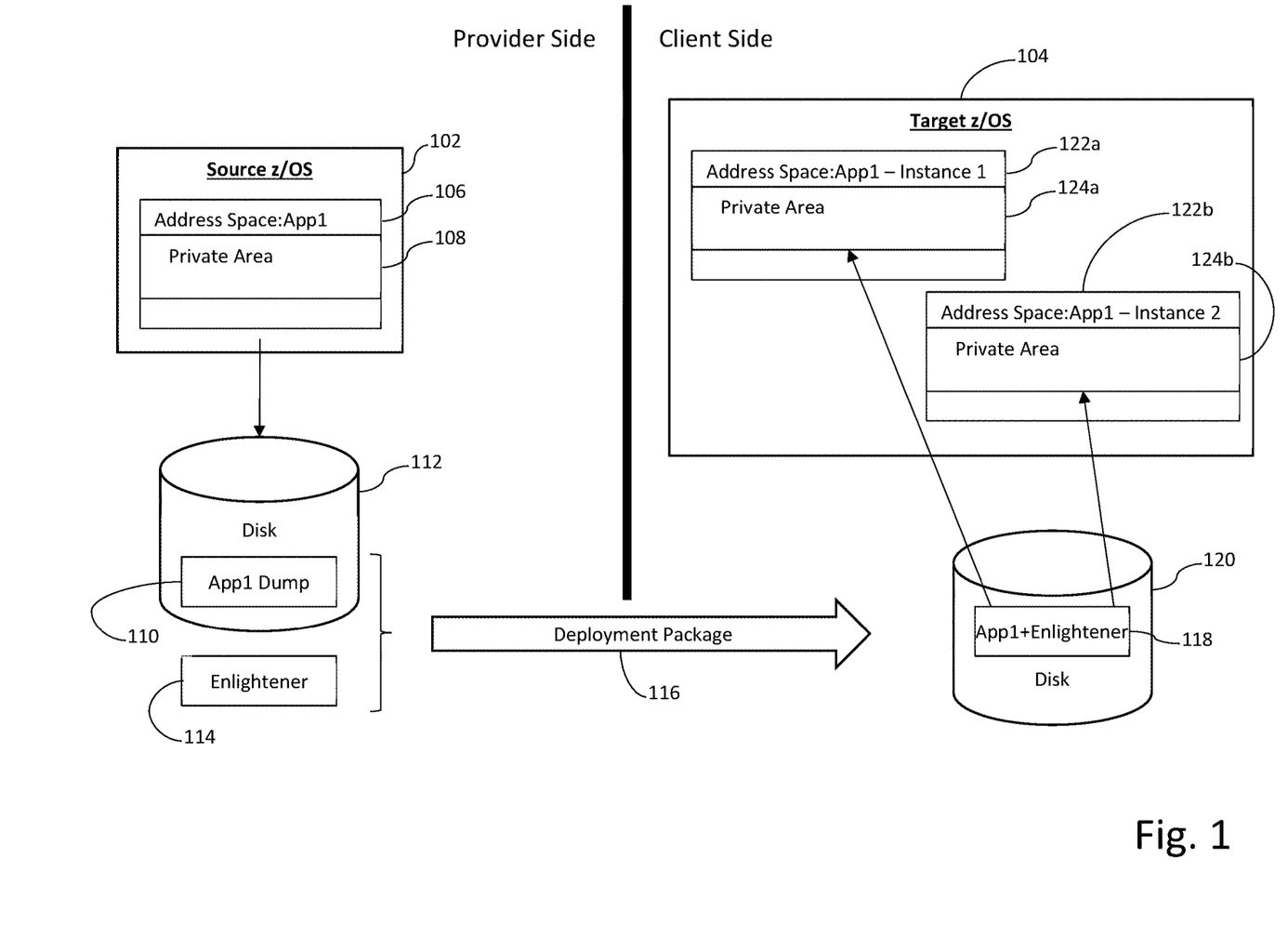
FIG. 1 is a block diagram illustrating architectural components of certain example embodiments.
Figure 2:
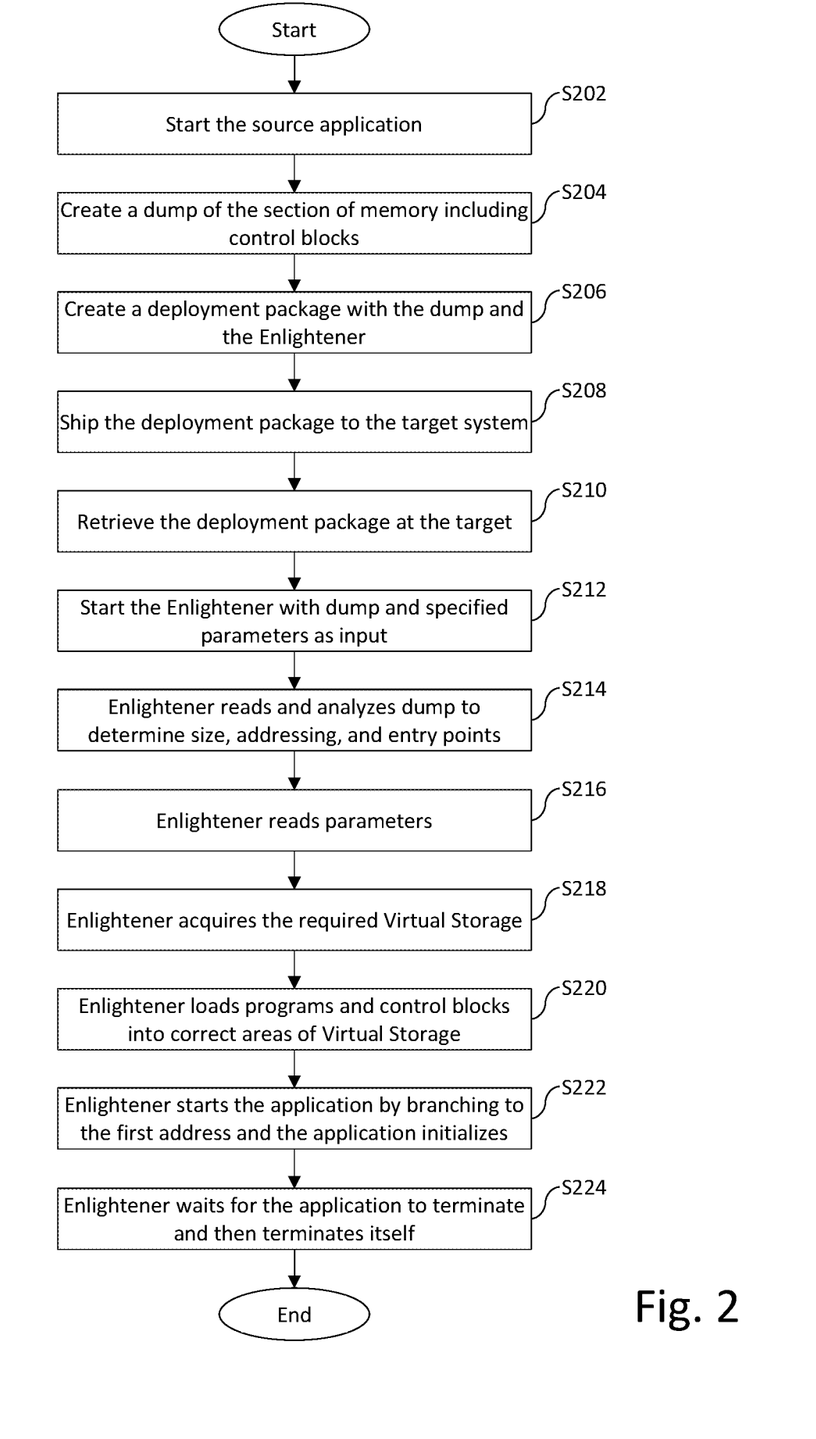
FIG. 2 is a flowchart showing a process for installing or updating software in accordance with certain example embodiments.

FIG. 1 is a block diagram illustrating architectural components of certain example embodiments, and FIG. 2 is a flowchart showing a process for installing or updating software in accordance with certain example embodiments. FIG. 1 shows a provider side and a client side. The provider side includes the source application to be installed and/or the source application that is the update, and the client side includes the mainframe computing elements where the application is to be installed and/or updated. In certain example embodiments, the provider side and the client side have common or different mainframe computing components. For example, as shown in FIG. 1, the provider side includes a mainframe running a source z/OS instance 102, and the client side includes a mainframe running a target z/OS instance 104. FIG. 1 may be thought of as being a client-server architecture, with the client side referring to the end-user using the application on the mainframe infrastructure.

It will be appreciated that mainframe computing elements include, for example, mainframe computers including processing resources such as, for example, one or more hardware processors (e.g., zIIP processors and/or general purpose processors), physical memory, virtual memory, network interfaces, input/output devices, and/or the like.

If it has not already been started, the source application App1 (the application to be installed and/or that has an update) is started (step S202 in FIG. 2). Doing so creates an Address Space 106 for the source application App1. The program module(s), including the control logic, is/are loaded into the Private Area 108 of Virtual Storage of the Address Space 106 in the source z/OS instance 102. In the case of z/OS, for example, control blocks are loaded into the Private Area 108. As source application App1 executes, additional control blocks may be dynamically created in the Private Area 108.

Using standard instructions, a dump 110 of the Private Area 108 of Virtual Storage of the Address Space 106 is created for the source application App1 (step S204 in FIG. 2). The dump 110 is saved to disk 112 on the provider side. The dump 110 may be saved in any suitable format such as, for example, a flat file or other dataset understandable by the mainframe. The disk 112 may be provided with the mainframe computer backing the source z/OS instance 102, or it may be remote therefrom.

An Enlightener 114 is created or otherwise made available, and a deployment package 116 is created (step S206 in FIG. 2). The deployment package 116 includes the dump 110 and the Enlightener instance 114.

In certain example embodiments, the memory dump may be started manually by an authorized user initiating a standard instruction to cause the memory dump. The packaging of the Enlightener with the memory dump similarly may be manual in certain example embodiments. In different example embodiments, some or all of this process may be at least partially automated. For example, a utility may be run to take the memory dump, package the Enlightener's code with the memory dump, and make the package available for transmission. In certain example embodiments, a wizard or other tool may be used to prompt the user for configuration or other information. In this regard, in certain example embodiments, the types of information needed may be defined for subsequent completion (e.g., on the target installation system) and/or values for the information may be provided.

The deployment package 116 is shipped from the client side to the target system (step S208 in FIG. 2). This may be accomplished by an upload/download procedure, publishing to a commonly-accessible network location, transportation via physical media, and/or any other suitable approach. The App1 dump and enlightener 118 ultimately are retrieved and saved to disk 120 of the target system (step S210 in FIG. 2).

The Enlightener on the disk 120 of the target system is started, with the dump and any specified parameters as input thereto (step S212 in FIG. 2). The parameters may vary based on a variety of factors including, for example, the application being installed and/or updated, the source and/or target environments, etc. Some common parameters that may be specified include, for instance, name of the instance, network port number the application instance should use, file or datasets to which logs should be written, whether SSL should or should not be used, etc. The Enlightener reads and analyzes the dump to determine the size, addressing, entry points, and/or other features of the application to be installed and/or updated (step S214 in FIG. 2). For example, with z/OS, the Enlightener may determine 24-bit vs. 31-bit vs. 64-bit addressing (or other addressing depending on the implementation), amount of Virtual Storage needed, etc. Any other parameters packaged together are read (step S216 in FIG. 2).

The Enlightener on the disk 120 of the target system acquires the needed memory from the appropriate locations (step S218 in FIG. 2). In the FIG. 1 example, and with z/OS, the Enlightener on the disk 120 of the target system determines that there are two App1 instances to be created/updated, a first instance provided via a first Address Space 122a and a second instance provided via a second Address Space 122b, and that each of the Address Spaces 122a-122b has an associated Private Area 124a-124b into which control blocks are to be loaded.

After the space has been acquired, the Enlightener on the disk 120 of the target system loads the programs and control blocks into the correct areas of the Virtual Storage (step S220 in FIG. 2). The Enlightener then starts the application instance(s) by branching to the first address, and the application initializes (step S222 in FIG. 2). Dynamically created programs, control blocks, or the like, can be created "as usual" in the target system during the normal course of running the newly installed and/or updated application instance. The Enlightener waits for the application instance(s) to terminate, and then terminates itself (step S224 in FIG. 2).

In this way, it is possible for the Enlightener to be run to cause z/OS on a target system create an Address Space and to cause the control blocks of the memory dump to be loaded into the Private Area of that created Address Space, enabling the newly installed and/or updated application to be run on the target system. The Enlightener may be an executable applicable to all memory dumps, or it may be tailored to an application in certain example embodiments. With regard to the former, for example, a "generic" Enlightener would always (for z/OS) just find the right memory area, load the control blocks, and then start the program, regardless of what the program is, and regardless of other features of the source and target systems. That is, in certain example embodiments, the Enlightener may be reusable for different applications without requiring customizations for those different applications. With regard to the latter, in the case of a more tailored Enlightener, specific parameters for the application may need to be set by the person creating the dump. Thus, the person creating the package may be prompted to supply for known configurations/parameters that are needed for the application. As one example, in certain cases, applications may use supervisory instructions, and authorization/permission to call these supervisory instructions may be needed via parameters in the target environment/system, and this more tailored approach could be helpful in those cases. In certain example embodiments, the Enlightener code may be packaged with the memory dump in the sense that it can be included in a flat file in an identifiable location, such as at the beginning thereof, so that it can be run easily by the target system. In certain example embodiments, the Enlightener code may be packaged with the memory dump in the sense that it can be included alongside (e.g., separate from, in a tar ball or other structure with, etc.) the memory dump.

Certain example embodiments will treat the entry point of the program as the first address in the dump. This may be helpful in terms of starting the newly-installed and/or newly-updated application from the beginning and handling the creation of dynamic control blocks. In certain example embodiments, it will not be possible to dynamically load additional modules or subprograms that belong to the application; but this can be mitigated because all code to be executed should be included in the initial dump. In certain example embodiments, the application may return back to the calling program, so that the calling program (the Enlightener) can terminate itself. This helps comport with standard procedures in mainframe environments, where a called program returns control to back to its calling program.

In certain example embodiments, the application may be programmed to produce a dump for distribution by itself when it is in a replicable state. Doing so may help automate installation and/or update procedures, e.g., as the application itself in the provider system can create a memory dump of itself after it reaches a steady state. Certain example embodiments may create a memory dump when triggered by an authorized user. In addition, or in the alternative, in certain example embodiments, the application itself may determine when it has reached a steady state and can take a memory dump of itself. This may be beneficial in certain example embodiments, as the dumps can be created safely and reliably at appropriate times. Steady states may be recognizable automatically in a number of different ways. For example, different code locations can be defined as involving a steady state. When the application reaches a defined location, it can create the memory dump or otherwise cause the dump to be created. In certain example embodiments, when the application reaches a steady state, the application can be triggered to take a dump of itself, and this automation can in some instances be coded by the provider of the application.

Although FIG. 1 shows one application on one source system being delivered to two application instances in one target system, it will be appreciated that the technology described herein is not so limited. For example, any cardinality (e.g., one-to-one, one-to-many, many-to-many, many-to-one) may be provided for source and target systems and/or source and target application/application instances. In this regard, one or more source systems could in some instances provide one or more application instance updates to one or more target systems (e.g., a single source application could be installed or one or more application instances on each of multiple different target systems). In certain example embodiments, one or more software application instances may be run simultaneously on a mainframe (e.g., in a z/OS environment). It will be appreciated that the application to be installed and/or updated may be installed and/or updated on the same or different type of mainframe computer in certain example embodiments. In certain example embodiments, the application to be installed and/or updated may be installed and/or updated on the same system (e.g., if there are multiple instances running, e.g., with one instance being up-to-date and another not being up-to-date).

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of installing and/or updating an application instance on a target mainframe computing system with a mainframe operating system without relying on a container virtualization layer, the method comprising:
executing packaged code on the target mainframe computing system, the packaged code having been received by the target mainframe computing system from a source mainframe computing system, which is running the mainframe operating system, as a part of a deployment package, the deployment package comprising 1) the packaged code, and 2) a memory dump of control blocks of a source application running on the source mainframe computing system, the control blocks constituting each program of the source application, the source application corresponding to the application instance to be installed and/or updated;
as part of the executing the packaged code;
identifying an area of memory of the target mainframe computing system into which the control blocks from the memory dump are to be loaded;
loading the control blocks from the memory dump into the identified area of memory; and
once at least the control blocks are loaded, causing the mainframe operating system of the target mainframe computing system to branch to a start address in the identified area of the memory, in installing and/or updating the application instance on the target mainframe computing system, wherein a program counter of the mainframe operating system is set to start the installed and/or updated application instance from the beginning, which is different from a program counter position from when the memory dump of the source application running on the source mainframe computing system was taken.

2. The method of claim 1, wherein the packaged code is packaged into a data structure, the data structure also including the memory dump.

3. The method of claim 1, wherein the source application comprises a plurality of programs.

4. The method of claim 1, wherein the identified area of memory is a private area of an address space of the target mainframe computing system.

5. The method of claim 4, wherein the memory dump is taken from a private area of an address space on the source mainframe computing system.

6. The method of claim 1, wherein the identified area of memory is identified based on size of the memory dump and addressing of instructions included in the memory dump.

7. The method of claim 1, wherein the packaged code is further programmed to run a garbage collector on the target mainframe computing system after loading the control blocks from the memory dump into the identified area of memory and prior to causing the target mainframe computing system to branch to the start address in the identified area of the memory.

8. The method of claim 1, wherein the memory dump includes one or more first control blocks and wherein counterpart control blocks for the one or more first control blocks are recreated at the target mainframe computing system during execution of the application instance, once installed and/or updated.

9. The method of claim 1, wherein the packaged code is further configured to provide one or more parameters to the application instance being installed and/or updated.

10. The method of claim 9, wherein the one or more parameters are provided prior to the deployment package being transmitted to the target mainframe computing system.

11. A non-transitory computer readable storage medium storing instructions that, when executed by a processor, are configured to perform the method of claim 1.

12. A method of preparing an installation of and/or update to an application instance on a target mainframe computing system with a mainframe operating system without relying on a container virtualization layer, the method comprising:
taking a memory dump of control blocks of a source application running on a source mainframe computing system, the control blocks constituting each program of the source application, the source application being a version of the application instance to be installed and/or updated;

creating a deployment package comprising the memory dump and packaged code, wherein the packaged code is executable on the target mainframe computing system, the packaged code, when executed being configured to cause the target mainframe computing system to perform operations comprising:
identifying an area of memory of the target mainframe computing system into which the control blocks from the memory dump are to be loaded;
loading the control blocks from the memory dump into the identified area of memory; and
once at least the control blocks are loaded, causing the mainframe operating system of the target mainframe computing system to branch to a first address in the identified area of the memory, in the installation and/or updating of the application instance on the target mainframe computing system, wherein a program counter of the mainframe operating system is set to the first address to start the installed and/or updated application instance from the beginning, which is different from a program counter position from when the memory dump of the source application running on the source mainframe computing system was taken.

13. The method of claim 12, wherein the packaged code is packaged into a data structure, the data structure also including the memory dump.

14. The method of claim 12, wherein the memory dump is taken from a private area of an address space on the source mainframe computing system.

15. The method of claim 12, wherein the memory dump includes one or more first control blocks created on the source mainframe computing system during execution of the source application thereon.

16. The method of claim 12, wherein the packaged code is further configured to provide one or more parameters to the application instance being installed and/or updated.

17. The method of claim 12, wherein the packaged code is reusable for different applications without requiring customizations for the different applications.

18. The method of claim 12, further comprising transmitting the deployment package to the target mainframe computing system and instructing the target mainframe computing system to execute the packaged code once received.

19. The method of claim 12, wherein the source application is programmed to initiate the memory dump automatically.

20. The method of claim 12, wherein the source application is programmed to initiate the memory dump automatically upon the source application reaching a steady state in execution.

21. The method of claim 20, wherein the steady state is identifiable by the source application as being a predefined location in source code of the source application.

22. The method of claim 12, wherein one or more steady state location identifiers is/are inserted into code of the source application, and wherein the source application is programmed to initiate the memory dump automatically upon the source application reaching the one or more steady state location identifiers.

23. A non-transitory computer readable storage medium storing instructions that, when executed by a processor, are configured to perform the method of claim 12.

24. A mainframe computing environment, comprising:
a target mainframe computing system to which an application is to be installed and/or updated without relying on a container virtualization layer, the target mainframe computing system including at least one first hardware processor and a first memory;
a source mainframe computing system including at least one second hardware processor and a second memory;
wherein the target mainframe computing system is configured to execute packaged code thereon, the packaged code having been received by the target mainframe computing system from the source mainframe computing system as a part of a deployment package, the deployment package comprising the packaged code and a memory dump of control blocks of a source application running on the source mainframe computing system, the control blocks constituting each program of the source application, the source application corresponding to the application instance to be installed and/or updated,
the packaged code, when executed, being programmed to cause the target mainframe computing system to perform operations comprising:
identifying an area of the memory of the target mainframe computing system into which the control blocks from the memory dump are to be loaded;
loading the control blocks from the memory dump into the identified area of memory; and
once at least the control blocks are loaded, causing the mainframe operating system of the target mainframe computing system to branch to a first address in the identified area of the memory, in installing and/or updating the application instance on the target mainframe computing system, wherein a program counter of the mainframe operating system is set to start the installed and/or updated application instance from the beginning, which is different from a program counter position from when the memory dump of the source application running on the source mainframe computing system was taken.

25. The system of claim 24, wherein the identified area of memory is a private area of an address space of the target mainframe computing system.

26. The system of claim 25, wherein the memory dump is taken from a private area of an address space on the source mainframe computing system.

27. The system of claim 24, wherein the identified area of memory is identified based on size of the memory dump and addressing of instructions included in the memory dump.

28. The system of claim 24, wherein the packaged code is further configured to provide one or more parameters to the application instance being installed and/or updated.

29. The system of claim 24, wherein the packaged code is reusable for different applications without requiring customizations for the different applications.

* * * * *